Oct. 11, 1955
C. BRACEY ET AL
2,720,048
FISHING ROD HOLDER
Filed Oct. 14, 1954
2 Sheets-Sheet 1
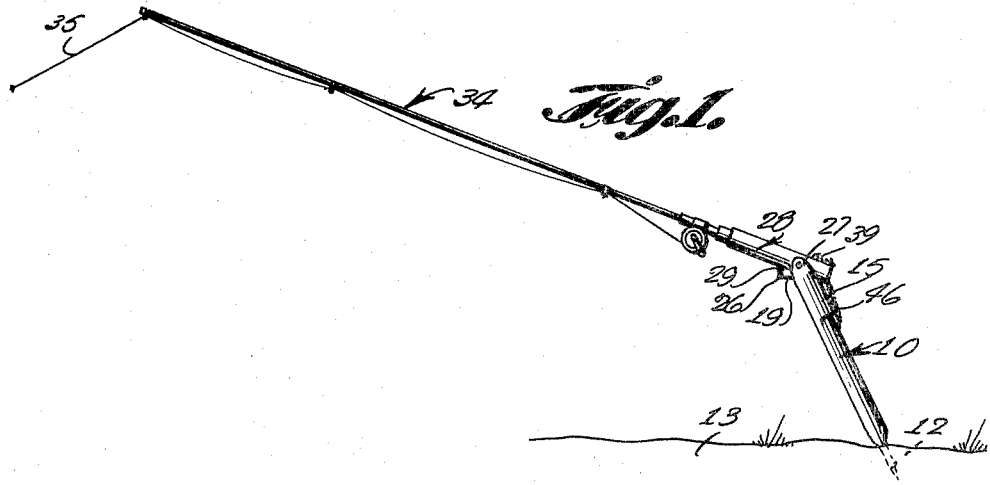
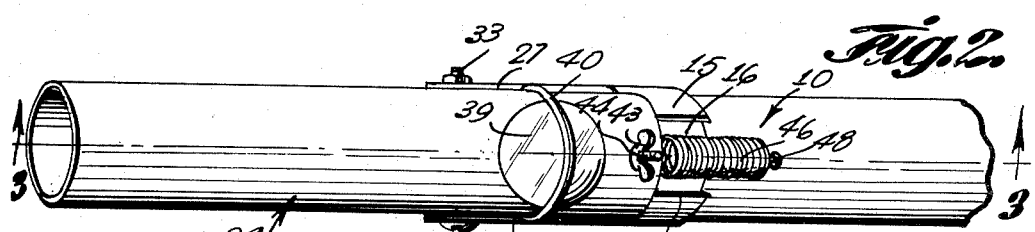
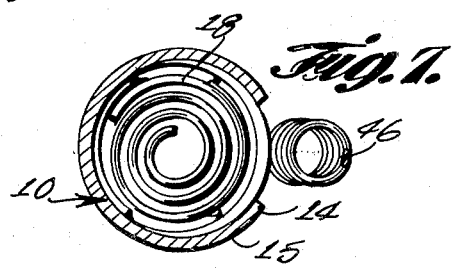
INVENTORS
Cecil Bracy &
Robert J. Barbour
BY Victor J. Evans & Co.
ATTORNEYS

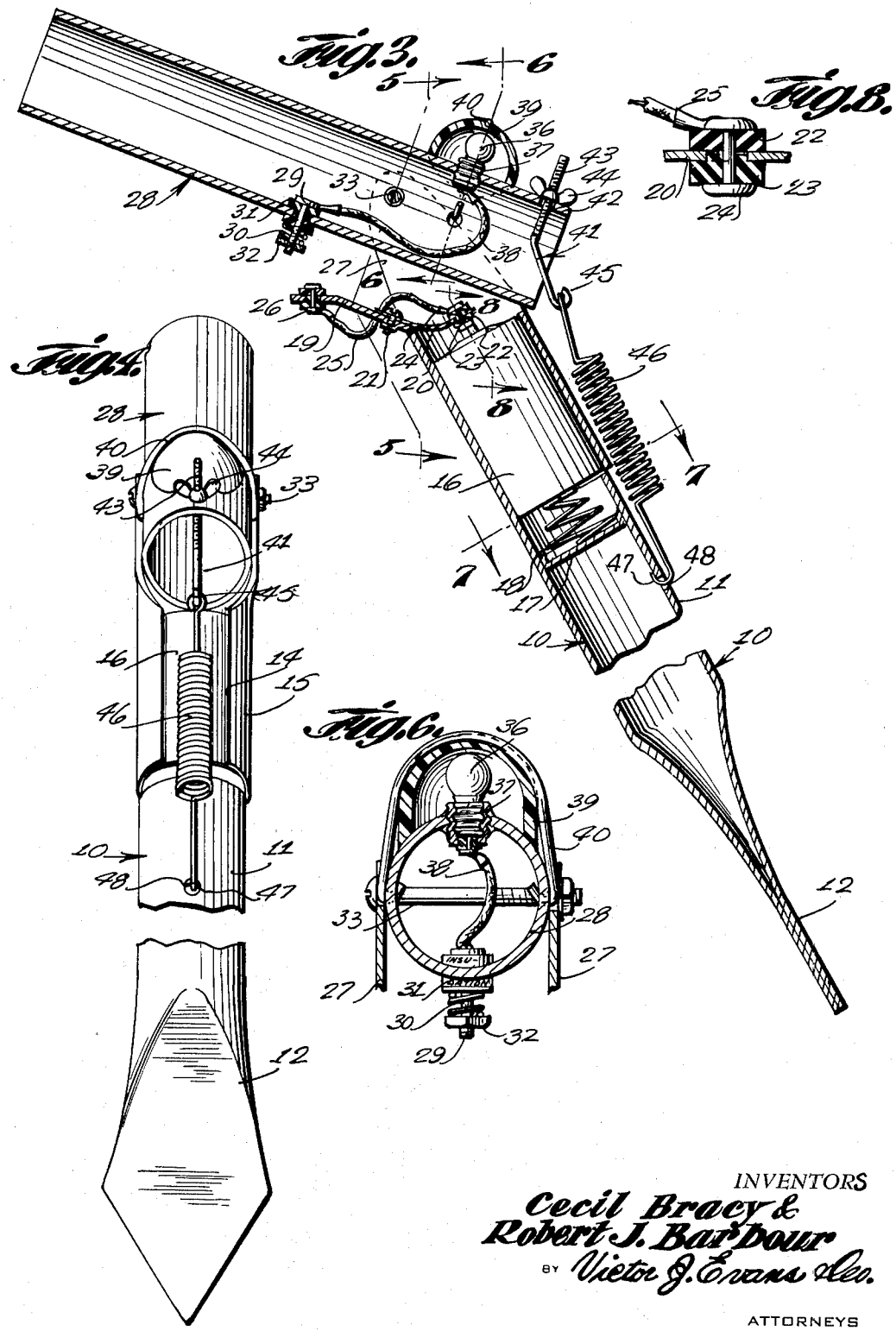

United States Patent Office 2,720,048
Patented Oct. 11, 1955

2,720,048

FISHING ROD HOLDER

Cecil Bracey and Robert J. Barbour, Archer City, Tex.

Application October 14, 1954, Serial No. 462,144

2 Claims. (Cl. 43—17)

This invention relates to a fishing rod or pole, and more particularly to a holder for a fishing rod.

The object of the invention is to provide a fishing rod holder which includes a light that is actuated when a fish strikes the line to thereby give notice to the fisherman that there is a nibble or bite on the line.

Another object of the invention is to provide a means for supporting a fishing rod wherein there is provided a signal which is automatically actuated when the fish contacts the line so that the fisherman will know to pick up the rod and land the fish.

Another object of the invention is to provide a fishing rod holder which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the fishing rod holder of the present invention in use.

Figure 2 is a fragmentary top plan view of the fishing rod holder.

Figure 3 is a sectional view taken on the line 3—3 of Figure 2.

Figure 4 is an end elevational view of the fishing rod holder.

Figure 5 is a sectional view taken on the line 5—5 of Figure 3.

Figure 6 is a partial sectional view taken on the line 6—6 of Figure 3.

Figure 7 is a sectional view taken on the line 7—7 of Figure 3.

Figure 8 is a partial sectional view taken on the line 8—8 of Figure 3.

Referring in detail to the drawings, the numeral 10 designates a base which can be made of any suitable material such as metal, and the base 10 includes a hollow tubular portion 11 and a lower pointed end 12 which is adapted to be inserted or driven into the ground. The base 10 further includes a cutout or split 14 the sides of which are spread apart to define an enlarged section 15 for holding snugly a conventional battery 16.

Positioned within the base 10 and secured thereto in any suitable manner is a partition 17, and a spring member 18 is interposed between the partition 17 and the bottom of the battery 16.

Extending outwardly from the upper end of the base 10 and secured thereto or formed integral therewith is a finger 19, Figure 3, and an arm 20 is secured to the finger 19 in any suitable manner, as for example by means of a bolt and nut assembly 21. A pair of insulated bushings 22 and 23 are mounted on the free end of the arm 20, and a contact 24 extends through these bushings 22 and 23, Figure 8, the contact 24 being arranged in engagement with the upper end of the battery 16. A conductor or wire 25 leads from the contact 24 to a contact 26 which is carried by the outer end of the finger 19 for a purpose to be later described.

Projecting upwardly from the base 10 and secured thereto or formed integral therewith is a pair of spaced parallel apertured ears 27. A tubular open ended support member or fishing rod holder 28 is pivotally mounted between the pair of ears 27 by means of a pin or bolt and nut assembly 33. An insulated bushing 31 extends through the metal support member 28, and a contact 29 is slidably mounted in the bushing 31. A coil spring 30 is circumposed on a portion of the contact 29, and a stop nut 32 is arranged in threaded engagement with a threaded portion of the contact 29. Thus, when a fish strikes the line 35 of the fishing rod 34, Figure 1, the support member 28 will pivot downwardly so that the end of the contact 29 will engage the upper end of the contact 26 whereby the electrical circuit between the battery 16 and a bulb 36 will be completed so that the fisherman will know that he has a bite on his line and so that he can then proceed to land the fish. The stop nut 32 limits upward movement of the contact 29, and the coil spring 30 serves to provide a resilient cushion or shock absorber when the contacts 29 and 26 engage each other, and the spring 30 also serves to normally bias the nut 32 and contact 29 to the position shown in Figure 3.

The bulb 36 is mounted in a socket 37 which is supported in the upper portion of the support member 28, and a wire 38 leads from the socket 37 to the contact 29. A shield 39 which may be made of any suitable material such as a transparent plastic surrounds the bulb 36 for protecting the bulb, and the shield 39 may be held in place by means of a suitable clip 40.

There is further provided a means for normally urging or biasing the support member 28 to its raised position whereby ordinarily the circuit to the bulb 36 will be disconnected. This means comprises a securing element 41 which has a threaded portion 43 extending through an opening 42 in the rear end of the support member 28. A wing nut 44 is arranged in threaded engagement with the portion 43, and the wing nut 44 may be adjusted on the bolt 41 as desired. The lower end of the securing element 41 is shaped to provide a hook 45, and a coil spring 46 has its upper end arranged in engagement with the hook 45. The lower end of the coil spring 46 is shaped to provide a hook 47 which is arranged in engagement with an opening 48 in the base 10. The numeral 13 in Figure 1 indicates the ground into which the pointed end 12 may be driven.

From the foregoing it is apparent that there has been provided a fishing rod or pole holder which will give a signal when a fish strikes or bites on the line 35. In use the base 10 may have its pointed end 12 driven into the ground or else the entire device can be attached to any suitable structure such as a boat in any suitable manner. Then the end of the rod 34 is inserted in the upper open end of the support member or holder 28 and the tension of the coil spring 46 is such that the support member 28 and rod 34 remain in their raised position as shown in Figures 1 and 3. Then, when a fish strikes the line or the hook on the line 35, the rod 34 and support member 28 will be pivoted downwardly about the pin 33 so that the lower end of the contact 29 will engage the upper end of the contact 26. This will complete the electrical circuit from the battery 16 to the bulb 36 so that the bulb 36 will be illuminated whereby the fisherman will know that a fish has struck the line. Then, the rod 34 may be removed from the support member 28 and the fish can be landed.

Any kind of fishing pole or rod can be supported in the holder and by means of the wing nut 44, the tension of the spring 46 can be adjusted. In actual practice when the fish bites on the line, the bulb 36 will blink on and off so as to give an effective signal to the fisherman. The light 36 makes the fishing rod holder especially suitable for use in night fishing. Thus, when a plurality of rods are being supported, there is no guesswork as to which of the lines the fish has struck and by means of the adjustability of the tension of the spring 46, fishing poles or rods of different weights can be accommodated.

We claim:

1. In a fishing rod holder, a base including a hollow body portion having a lower pointed end, the lower pointed end of said portion being adapted to be inserted in the ground, said base being split at its upper end and spread apart to provide an enlarged portion, a partition secured within said base below said enlarged portion, a battery positioned in said enlarged portion, a coil spring interposed between said battery and partition, a finger extending outwardly from the upper end of said base, an arm electrically connected to and extending between the top of said battery and said finger, a first contact carried by the outer end of said finger, a pair of apertured ears extending upwardly from said base, a hollow tubular open ended support member pivotally mounted between said pair of ears, a light bulb carried by said support member, a second contact carried by said support member and mounted for movement into and out of engagement with said first contact, and a conductor connecting said second contact with the said bulb.

2. The structure as defined in claim 1, and further including a securing element connected to said support member, and a coil spring connected to and extending between said securing element and said base in such a manner as to bias the support member into a position in which the contacts are spaced apart.

References Cited in the file of this patent

UNITED STATES PATENTS

| | | |
|---|---|---|
| 2,166,657 | Evelyn | July 18, 1939 |
| 2,538,788 | Massino | Jan. 23, 1951 |
| 2,631,400 | Nagle | Mar. 17, 1953 |